(12) United States Patent
Moriyama et al.

(10) Patent No.: US 6,492,031 B1
(45) Date of Patent: Dec. 10, 2002

(54) REFLECTOR SUBSTRATE FOR ILLUMINATION DEVICE AND REFLECTOR FOR ILLUMINATION DEVICE

(75) Inventors: Hideki Moriyama, Nagoya (JP); Uhara Kenji, Nagoya (JP); Hideaki Machida, Yokohama (JP)

(73) Assignee: DuPont-Toray Co. Ltd., Tokyo (JP)

(*) Notice: Subject to any disclaimer, the term of this patent is extended or adjusted under 35 U.S.C. 154(b) by 19 days.

(21) Appl. No.: 09/658,183

(22) Filed: Sep. 8, 2000

Related U.S. Application Data

(63) Continuation-in-part of application No. 09/267,807, filed on Mar. 12, 1999.

(30) Foreign Application Priority Data

Sep. 17, 1999 (JP) ............................................. 11-262909

(51) Int. Cl.[7] .............................. B32B 15/08; G02B 5/08
(52) U.S. Cl. ................. 428/458; 428/473.5; 428/912.2; 359/838; 359/883; 362/296; 362/341; 362/347
(58) Field of Search ............................. 428/458, 473.5, 428/912.2; 359/838, 883; 362/296, 341, 347

(56) References Cited

U.S. PATENT DOCUMENTS

| | | |
|---|---|---|
| 3,644,730 A | 2/1972 | Ogle, Jr. et al. |
| 3,515,067 A | 5/1976 | Rits |
| 4,008,348 A | 2/1977 | Slemp |
| 4,403,277 A | 9/1983 | Eargle, Jr. et al. |
| 4,457,598 A | 7/1984 | Smimabukura et al. |
| 4,832,453 A | 5/1989 | Saad-Cook |
| 4,875,766 A | 10/1989 | Shimodaira |
| 5,124,900 A | 6/1992 | Varey et al. |
| 5,169,229 A | 12/1992 | Hoppert et al. |
| 5,177,396 A | 1/1993 | Gielen et al. |
| 5,251,064 A | 10/1993 | Tennant et al. |
| 5,597,631 A | 1/1997 | Furumoto et al. |
| 4,666,760 A | 5/1997 | Hasuda et al. |
| 5,872,699 A | 2/1999 | Nishii et al. |

FOREIGN PATENT DOCUMENTS

| | | |
|---|---|---|
| EP | 0 690 111 A1 | 1/1996 |
| JP | 59142248 | 8/1984 |
| JP | 63277265 | 11/1988 |
| JP | 04162491 | 6/1992 |
| JP | 04188792 | 7/1992 |
| JP | 05007067 | 1/1993 |

OTHER PUBLICATIONS

Patent Abstracts of Japan, vol. 016, No. 039 (P–1305), Jan. 30, 1992 & JP 03 245101 A (Matsushita Electric Works Ltd.), Oct. 31, 1991.

Patent Abstracts of Japan, vol. 015, No. 489 (M–1189), Dec. 11, 1991 & JP 03 210701 A (Toshiba Lighting & Technol Corp.), Sep. 13, 1991.

*Primary Examiner*—D. S. Nakarani

(57) ABSTRACT

A reflector substrate (1) adapted for use in illumination device (8) comprises an a molded aromatic polyimide film wherein the film has a glass transition temperature from 210 to 290° C. and said polyimide film has structural units of general formula (I) and (II):

-continued
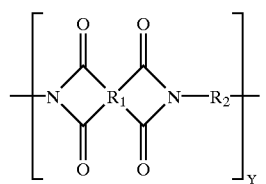
(II)
wherein R₁ is selected from the group consisting of:
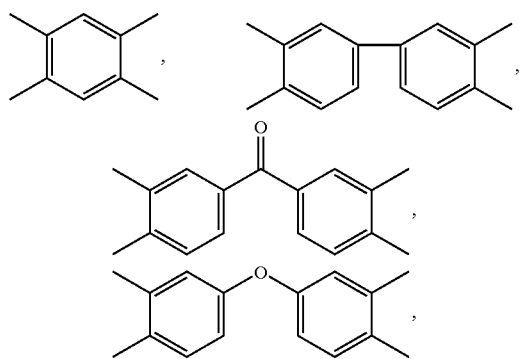
wherein R₂ is selected from the group consisting of:
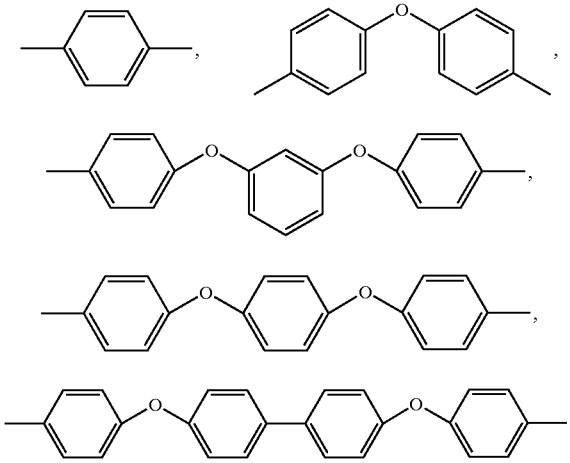
and said polyimide film has the molar ratio X:Y from 100:0 to 20:80.
6 Claims, 1 Drawing Sheet

REFLECTOR SUBSTRATE FOR ILLUMINATION DEVICE AND REFLECTOR FOR ILLUMINATION DEVICE

CROSS REFERENCE TO RELATED APPLICATIONS

This application is a continuation in part of U.S. patent application Ser. No. 09/267,807, filed on Mar. 12, 1999.

FIELD OF THE INVENTION

The present invention relates to a formable polyimide film molded article used as a reflector substrate for an illumination device. The reflector substrate has deposited onto it a reflecting surface to form a reflector. The reflector is used as a lamp reflector mainly in automotive headlights or fog lights.

BACKGROUND OF THE INVENTION

Lamp reflectors generally used in automotive headlights and fog lights are composed of reflector substrates made of glass, metal (e.g., aluminum), or injection or compression-molded plastic (e.g., polyphenylene sulfide, unsaturated polyester resin) on to which a metal reflective layer is deposited using aluminum, nickel-chromium alloy, titanium oxide or the like as the reflecting layer.

Because light sources such as halogen bulbs and xenon bulbs are primarily used in automotive headlights and fog lights for high luminescence, the temperature of the fixture near the base of the bulb rises to over 200° C. For this reason, current reflector substrates are made of glass or metal which are heavy, or are made as an injection or compression molded plastic article containing an additional inorganic reinforcement layer such as glass fibers or calcium carbonate (i.e., a reinforced resin molding) which is currently adhered to the substrate by subsequent processing steps.

The use of glass as the reflector substrate presents a number of problems, such as its heavy weight and the ease with which it breaks if placed under stress. When a metal or a reinforced resin molding is used as the reflector substrate, the heavy weight is compounded by other problems, primarily the need to carry out secondary processing steps, such as resin coating prior to vapor deposition, to the reflective substance. The result is an increased number of manufacturing steps to form the part.

Reinforced resin moldings provide a lightweight alternative to metal reflector substrates. However, these resin moldings must have considerable wall thickness both to provide the substrate with the necessary strength and because of inherent limitations in the actual molding technique. One adverse result is the low heat dissipation of the substrate itself. In lamps for example, where the construction is prone to heat buildup (e.g., projector type lamps), the thermal stability of the resin molding is not entirely adequate for good shape retention in the presence of heat. Moreover, the thick wall of the substrate (an insulating material) promotes a temperature rise within the housing, which in turn, shortens the life of the bulb.

Another problem encountered with the use of a reinforced resin moldings as the reflector substrate is that the material can generate gases such as chlorine compounds when the unit is lit and upon heating of the lamp. These gases will condense and deposit, for example, on the front lens of an automotive headlight. This can form a mist, or condensate, on the inside of the lens housing which of course impedes the performance of the lamp.

Previous art describes a sheet-type reflector made of a film sheet that has been mirror-treated by the vapor deposition of aluminum, and discloses that this sheet-type reflector does not require pretreatment such as degreasing to achieve the desired properties. However, the film sheet used in this case is made of polyethylene, which has a poor heat resistance. Accordingly, a polyethylene sheet-type reflector cannot be used as a reflector substrate in headlamps that employ lights which generate a high amount of heat, such as halogen bulbs or xenon bulbs, due to the film sheet's inadequate shape retention upon heat exposure.

Other art discloses a reflecting mirror comprising a visible light-reflecting infrared light-transmitting multi-layer film on a reflector base made of a polyimide resin and polyetherketone resin film. In addition to having a high resistance to breakage, this reflecting mirror is also described as capable of withstanding heat generation from halogen bulbs and the like because it is made of polyimide resin. Yet, given that this reflecting mirror is composed of a visible light-reflecting, infrared light-transmitting multi-layer film formed on the substrate, it cannot be put to practical use as a reflector in automotive headlights and fog lights.

SUMMARY OF THE INVENTION

The present invention was ultimately arrived at following investigations aimed at resolving the above-described problems in the related art.

It is therefore the first goal of the invention to provide a reflector substrate formable into a main body for use as an illumination device which, is lightweight, has excellent surface smoothness, is safe, is easily processable, is heat resistance, and is easy to handle.

A second goal of the invention is to provide a low-cost, high-quality lamp reflector which is suitable for large-volume production because it does not require pre-treatment of the reflector substrate at the time the reflecting layer is formed.

To achieve the first goal, the main body of the illumination device of the present invention is comprised of a shaped article made of a formable thermoplastic aromatic polyimide film having excellent heat resistance. Accordingly, it has a good surface smoothness and does not require pre-treatment at the time of reflective layer formation. Moreover, it is the use of a thermoplastic aromatic polyimide formulation having a glass transition temperature of 210 to 290° C. which enables the main body of the illumination device to be produced rapidly and at low cost by a vacuum forming process. In addition, it is lightweight and resistant to breakage which makes it an excellent, safety, and handleable unit.

To achieve the second goal the illumination device of the invention is comprised of a main body composed of a shaped article made of a specific plastic film having excellent heat resistance and surface smoothness on which a reflective substrate has been formed by vapor deposition. Accordingly, there is no need for pre-treatment such as resin coating prior to vapor deposition of the reflective substrate, which enables the lamp reflector to be mass-produced at low cost. Moreover, the illumination device does not degas which becomes a practical obstacle when other devices are lit. Hence, in addition to polyimide's excellent heat dissipation and safety, the reflector substrate exhibits other high quality performance features such as high heat resistance and excellent specular properties. This combination of features make it advantageous for use as an illumination device in automotive headlights and fog lights, and also large floodlights.

BRIEF DESCRIPTION OF THE DRAWINGS

The main body of the illumination device and the reflective substrate are described more fully below in conjunction with the attached diagrams.

Explanation of Symbols

Figure 1:
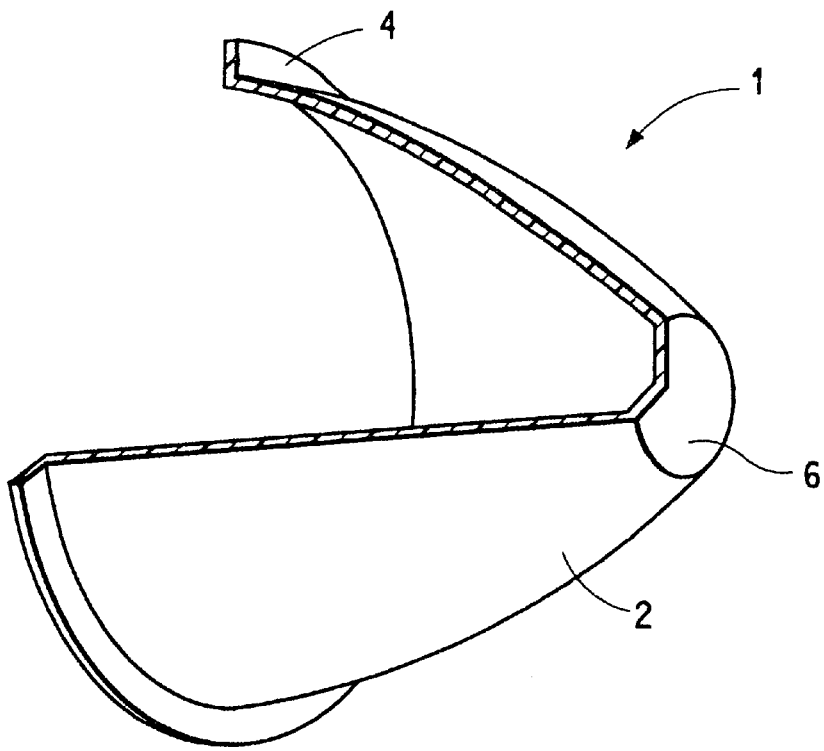
FIG. 1 is a partially cutaway perspective view showing the main body of the illumination device according to the invention.
Figure 2:
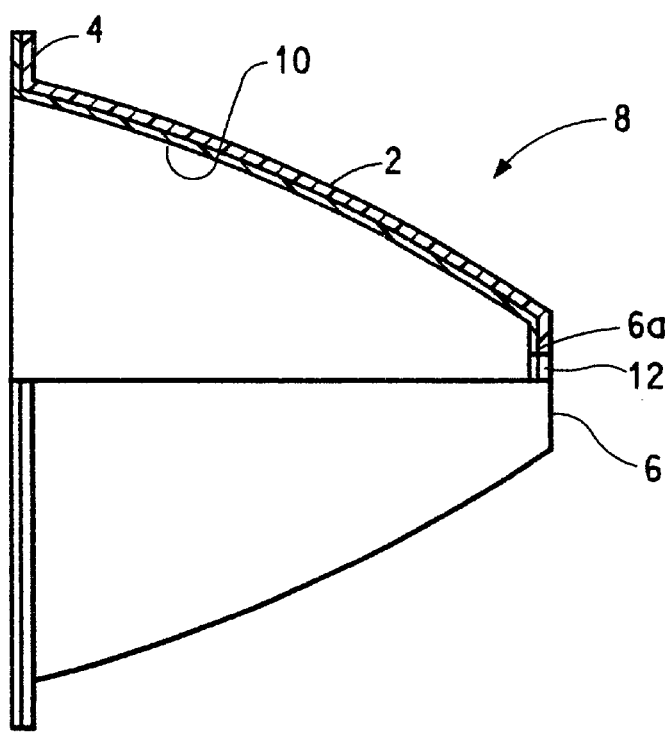
FIG. 2 is a partially cutaway side view showing an embodiment of the illumination device according to the invention.

1. Reflector substrate for illumination device
2. Main Body
4. Exterior flange portion
6. Interior flange portion
6a. Interior flange
8. Reflector for illumination device
10. Reflecting layer
12. Light bulb insert opening

DETAILED DESCRIPTION OF THE INVENTION

Accordingly, to practice the invention the reflector substrate mentioned in the present invention comprises of a shaped article made of a thermoplastic aromatic polyimide film having a glass transition temperature from 210 to 290° C. Also accordingly the thermoplastic aromatic polyimide film is composed of a thermoplastic polyimide having structural units of general formula (I) and (II)

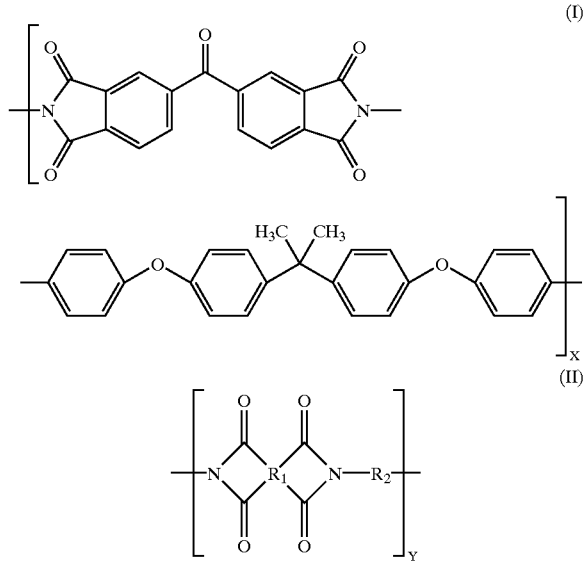

and the glass transition temperature of the thermoplastic polyimide film is from 230 to 270° C. In the above formulas, $R_1$ is selected from the group consisting of

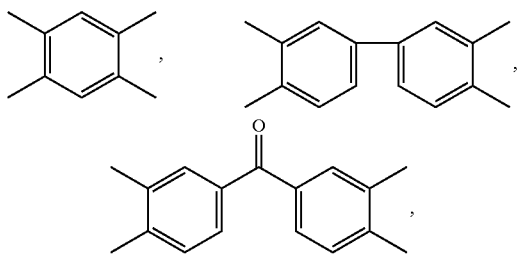

-continued

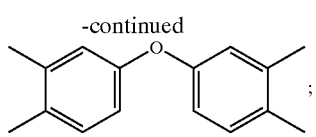

$R_2$ is selected from the group consisting of

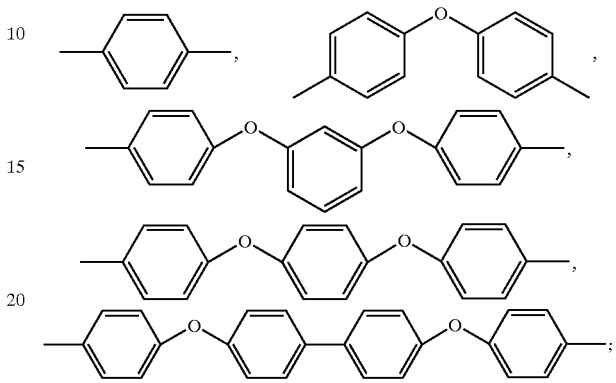

and the molar ratio X:Y is from 100:0 to 20:80, preferably from 90:10 to 70:30.

It is advantageous for the shaped molded article to be produced by plug-assist thermoforming or vacuum forming a film. The shaped molded article typically has a main body, which has formed on it the reflecting surface, and also has an exterior flange portion and an interior flange portion.

The main body of the illumination device of the present invention is a shaped article made of a low glass transition temperature polyimide film having inherently outstanding heat resistance and formability. Hence, the surface smoothness is adequately good whereby an additional pretreatment step, at the time the reflective layer is deposited, is unnecessary. This makes it possible to obtain the main body of the illumination device at low cost by an easy forming process such as vacuum forming. Moreover, because the main body is primarily made of a plastic material the illumination device is lightweight and highly resistant to breakage, giving it excellent safety and handleability performance.

In the main body of the illumination device of the present invention, it is preferable for the shaped article to have been arrived at by vacuum forming the above-described film and for the main body to have an exterior flange portion and an interior flange portion. Applying these conditions enables the advantages of the invention to be further enhanced.

Other aspects of the present invention are that the illumination device comprises a reflector substrate of a shaped article made of a thermoplastic aromatic polyimide film having a glass transition temperature of from 210 to 290° C. The main body also contains a reflecting layer, which has been formed by the vapor deposition of a reflective material. According, one preferred aspect thereof is that the reflective material is aluminum or silver.

Because the reflector substrate is composed of a smooth film, which itself has excellent heat resistance, pre-treatment of the shaped article to smooth the surface, such as resin coating, is not necessary prior to vapor deposition of the reflecting layer. This makes it possible to manufacture the illumination device at low cost and by mass production without additional processing steps. Moreover, the illumination device is very lightweight, resistant to breakage, and does not degas upon heating. Hence, not only does the illumination device have excellent heat dissipation, safety, and handleability, it also has high heat resistance and good specular properties, which in essence exhibit a high-quality performance part for use as an illumination device.

For the illumination device of the present invention, it is preferable for the reflecting layer to be formed by vapor deposition of aluminum or silver. However, suitable use can also be made of a chemically stable metal compound. In addition, a reflective material such as chromium or nickel-chromium alloy can be used as an intermediate layer to enhance the adhesive strength of the reflective material with the reflector substrate. It is also preferable for the illumination device to have a main body that also have an exterior flanged portion and an interior flanged portion such that the reflecting layer is formed on at least all of the main body. The advantages of the invention can be further enhanced by applying these conditions.

EXAMPLES

Examples are given below to further specifically explain this invention.

Example 1

A 500 ml separable flask equipped with a DC stirrer was charged with 2,2-bis [4-(4-aminophenoxy)phenyl]propane (34.12 g, 249 mmol) and N,N-dimethylacetamide (207.71 g), following which the mixture was stirred in a nitrogen atmosphere at room temperature. 3,4,3',4'-Benzophenonetetracarboxylic dianhydride (25.98 g, 242 mmol) was added in several divided portions during a period extending from 30 minutes to one hour after stirring was begun. The 3,4,3',4'-benzophenonetetracarboxylic dianhydride that remained attached to the powder funnel was washed into the reaction system using 0 [sic] ml of N,N-dimethylacetamide. Additional stirring was carried out for one hour, after which a N,N-dimethylacetamide solution of pyromellitic dianhydride (6 wt %, 13.39 g) was added in drops over a period of 30 minutes and stirring was continued for one hour. The resulting polyamic acid had a viscosity of 3500 poise.

Some of the resulting polyamic acid was placed on a polyester film and spin coated to form a uniform film. The spin-coated film was immersed for 5 minutes in a β-picoline/acetic anhydride mixed solution (50:50) to effect imidization. The resulting polyimide gel film was heat treated at 200° C. for 30 minutes, 300° C. for 20 minutes and 400° C. for 5 minutes, giving a polyimide film. The polyimide film thus obtained had a thickness of 125 μm, a Young's modulus of 3.2 GPa, a coefficient of thermal expansion (CTE) of 60 ppm/° C., and a glass transition temperature (TG) of 230° C. The resulting film was plug-assist thermoformed to give a reflector for an illumination device for use as an automotive headlight having the shape shown in FIG. 1.

Example 2

A reflector for an illumination device used as an automotive headlight having the shape shown in FIG. 1 was obtained by vacuum forming the film produced in Example 1.

Comparative Example 1

A reflector for an illumination device for use as an automotive headlight having the shape shown in FIG. 1 was obtained by plug-assist thermoforming using higher glass transition KAPTON® (E. I. Du Pont de Nemours and Co. for aromatic polyimide film; thickness, 75 to 125 microns; TG, 300° C.).

Comparative Example 2

Vacuum forming was attempted using higher glass transition KAPTON® (E. I. Du Pont de Nemours and Co. for aromatic polyimide film; thickness, 75 to 125 microns; TG, 300° C.), but the reflector substrate for an automotive headlight having the shape shown in FIG. 1 could not be obtained in this way.

The results of the above examples are presented in Table 1 below.

TABLE 1

|  | Glass transition temperature | Forming Process | Forming time (min) |
| --- | --- | --- | --- |
| Example 1 | 240 | Plug-assist thermoforming | 30 |
| Example 2 | 240 | Vacuum forming | 10 |
| Comp. Ex. 1 | 300 | Plug-assist thermoforming | 30 |
| Comp. Ex. 2 | 300 | Vacuum forming | forming was impossible |

The surface smoothness of the resulting main body of the illumination device retained intact the smoothness of the original film, and was sufficient to achieve a reflecting surface for a floodlight.

Next, aluminum was vapor deposited onto the main body of the illumination device by a vacuum evaporation process known to the art, thereby forming a 0.3 micron thick reflecting layer. In this reflecting layer forming step, although no pretreatment (e.g., resin coating, degreasing) was carried out, a very smooth vapor-deposited surface was obtained. An opening was formed at the center of the inner flange area of the reflector for use as a light bulb receptacle, and an inner flange was formed at the periphery of the receptacle.

The resulting reflecting layer had very high smoothness. When actually used as a headlight reflector, sufficient reflected light was obtained.

This illumination device had a very low weight compared with other headlight components. Moreover, because the aromatic polyimide film had excellent heat dissipation and a thinner wall thickness, it was able to dissipate lamp heat to a greater degree than thicker walls, thereby enhancing the service life of the reflector and the headlight.

The reflector substrate of the invention can also be vacuum-formed, making it possible to greatly shorten the cycle time needed to produce the part. Also, in contrast with plug-assist thermoforming, which requires both a male and a female die, vacuum forming does not require a male die and so is advantageous over plug-assist thermoforming in terms of cost as well.

What is claimed is:
1. A lamp reflector substrate comprising a shaped article made of a thermoplastic aromatic polyimide film having a glass transition temperature of from 210 to 290° C., wherein the thermoplastic aromatic polyimide film has structural units of general formula (I) and (II):

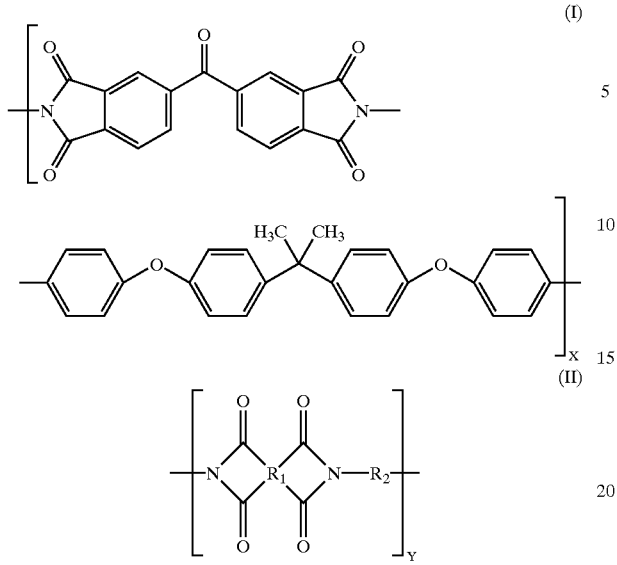

(I)

(II)

wherein $R_1$ is selected from the group consisting of:

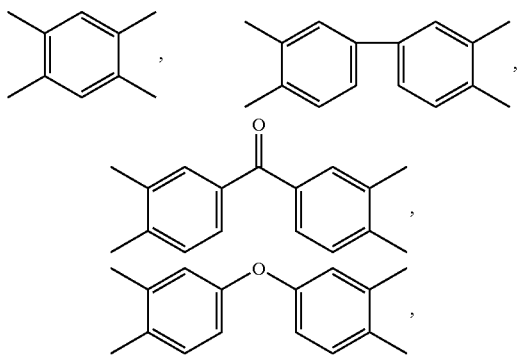

wherein $R_2$ is selected from the group consisting of:

and said polyimide film having the molar ratio X:Y from 100:0 to 20:80.

2. The reflector substrate of claim 1 wherein said polyimide film molar ratio X:Y is from 90:10 to 70:30.

3. The reflector substrate of claim 1 wherein said polyimide film shaped article is made by plug-assist thermoforming or vacuum forming said film.

4. The reflector substrate of claim 3 wherein said polyimide film shaped article comprises a main body which forms a reflecting surface, an exterior flange portion, and interior flange portion.

5. A reflector comprising a reflector substrate in accordance with claim 1 having a reflecting layer formed by vapor depositing a reflecting material on the reflector substrate.

6. The reflector of claim 5 wherein said reflecting layer is generated by vapor depositing aluminum or silver.

* * * * *